Aug. 16, 1966  W. J. READING ETAL  3,266,586
WEIGHING MACHINE
Filed Jan. 27, 1964  3 Sheets-Sheet 1
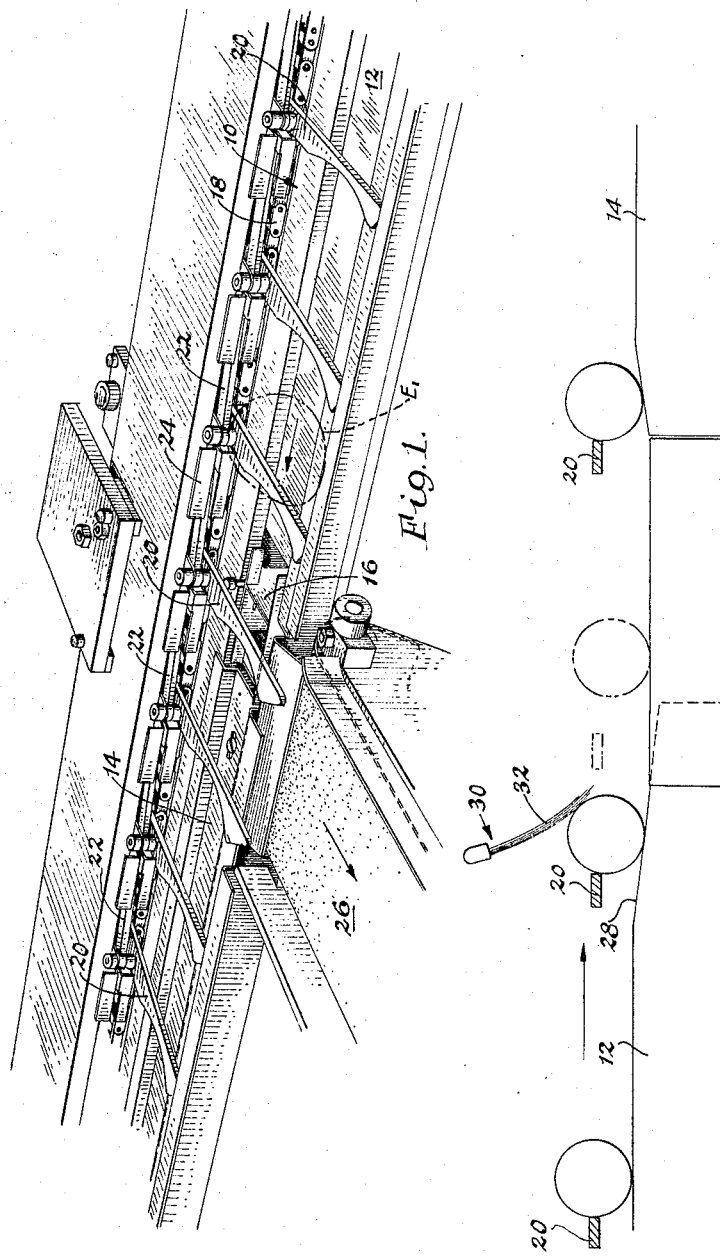
INVENTORS
WALTER J. READING
PAUL O. KESER
BY
Bean, Brooks, Buckley + Bean
ATTORNEYS

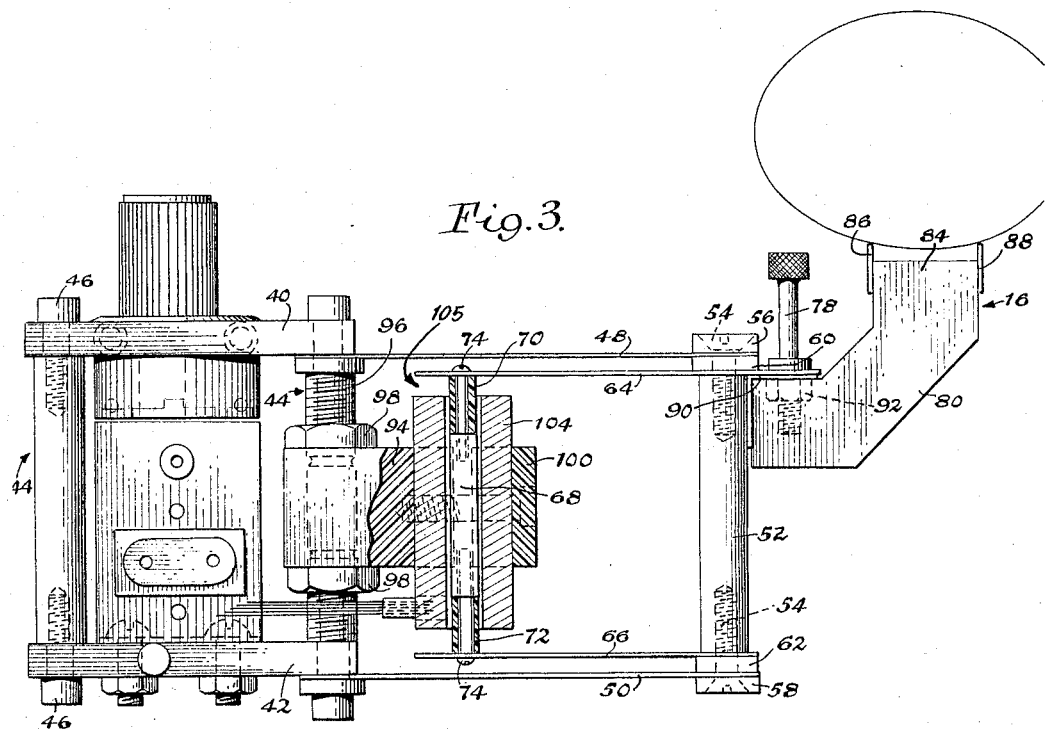
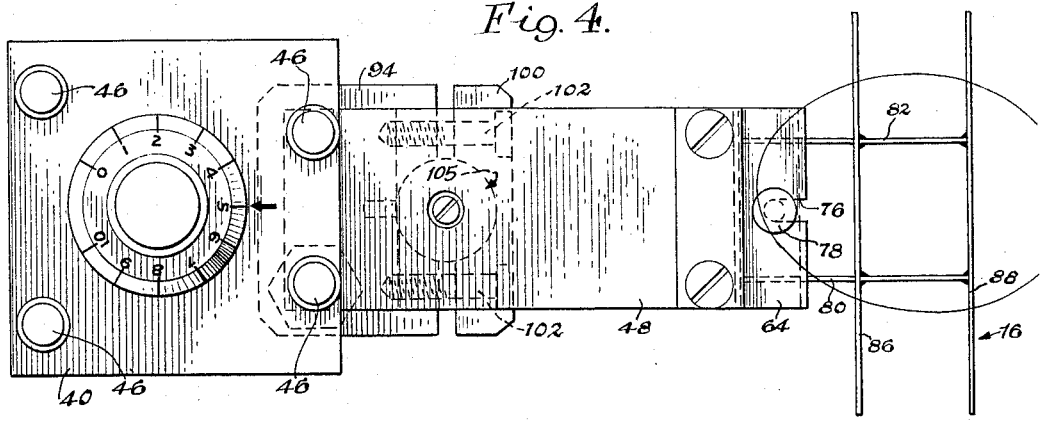

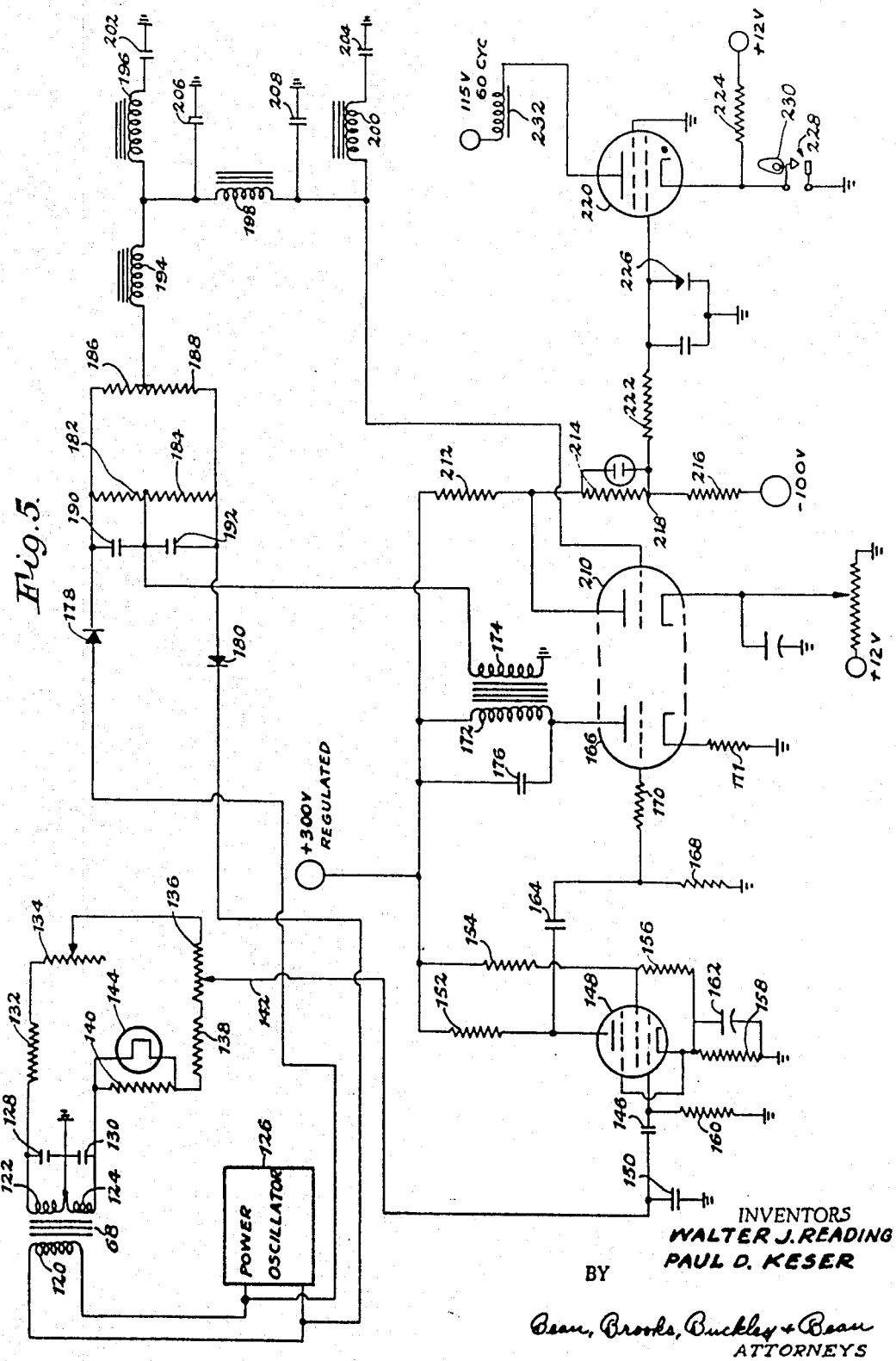

United States Patent Office 3,266,586
Patented August 16, 1966

3,266,586
WEIGHING MACHINE
Walter J. Reading, Ottumwa, and Paul D. Keser, West Burlington, Iowa, assignors, by mesne assignments, to Barker Poultry Equipment Company, Ottumwa, Iowa, a corporation of Iowa
Filed Jan. 27, 1964, Ser. No. 340,229
6 Claims. (Cl. 177—210)

This invention relates to egg grading machines and is directed, in particular, to an improved arrangement for grading eggs by weight.

The grading of eggs by weight as the same are moved continuously or intermittently along a given path is conventionally accomplished by a plurality of longitudinally spaced mechanical scales, each of which is responsive to a weight exceeding a certain amount (different for each scale) so as to trip or actuate some mechanism for routing or delivering any egg exceeding the certain amount to a storage or transfer area for eggs of that particular grade. Thus, such a system which grades eggs according to large, medium and small, for example, would require two scales; the first encountered scale being responsive to a weight corresponding to the minimum weight of a "large" egg; the second encountered scale being responsive to a weight corresponding to the minimum weight of a "medium" egg; and any eggs to which neither of these scales respond would be classed as "small." Such a system is unlikely to be encountered in practice since a normal practice is to break the grades into a greater number of classes; however the exemplary system serves to illustrate the principles of the present invention.

The main problem encountered in a system such as the above is that it is virtually impossible to assure accurate grading if one also seeks to achieve high capacity for the system. Due to the fact that individual eggs vary substantially in shape and contour, even within a given grade, it is most difficult to obtain a "smooth" transfer of eggs onto the scale platforms. As a result, a "medium" or even a "small" egg, if not smoothly transferred, may cause the "large" scale to respond and such an egg would be erroneously routed to the "large" grade area. This effect may be overcome by providing some type of timing device which prevents the scale from responding until after the egg has been transferred to and maintained for a time on the scale platform. However, such a timing device can be incorporated with a mechanical scale only at the expense of limiting the capacity of the machine owing to the fact that the inertia of the parts of a requisite mechanical scale is great enough so that damping of the oscillations caused by "rough" transfer of an egg will consume an inordinate amount of time. Thus, the machine cannot be operated faster than would allow the eggs to remain on the scale sufficiently long as to permit the oscillations to be significantly damped out. Moreover, mechanical scale mechanisms require a number of moving parts which are subject to damage and which are difficult to maintain in clean condition for maximum performance, particularly in view of the fact that egg machines must constantly operate under the assumption that some degree of egg breakage is inevitable.

It is, accordingly, an object of this invention to provide an improved egg weighing device which will assure accurate weighing and consequent grading of eggs even under conditions of high capacity. For example, the mechanism according to the present invention is capable of accurately grading eggs at the rate of thirty cases per hour, corresponding to three accurate weighing and grading operations per second.

More specifically, it is an object of this invention to provide an improved machine of the character described in which the weighing operation is performed in electromechanical fashion, the arrangement being such that the mechanical and electrical components are compatibly organized in order to achieve both accuracy and rapidity of operation, all with a minimum of mechanical components, and in which such mechanical components as would be detrimentally affected by dirt or foreign material are so positioned as to be well protected.

Other objects and advantages of the invention will appear from the description hereinbelow and the accompanying drawing wherein:

FIG. 1 is a perspective view showing a portion of a grading machine according to this invention, the egg-arrester being omitted;

FIG. 2 is a diagrammatic illustration showing the principles of the egg-arrester;

FIG. 3 is a side elevational view, parts being broken away, showing the mechanical features of the weighing mechanism;

FIG. 4 is a top plan view of the assembly shown in FIG. 3; and

FIG. 5 is a circuit diagram of the weighing circuit.

Referring to FIG. 1, an egg grading machine according to this invention includes a trackway 10 along which eggs are propelled. The trackway is divided into spaced, aligned sections such as those shown at 12 and 14 with the spaces between sections being bridged by scale platforms, one of which is designated by the reference character 16. Along one side of the trackway is disposed the upper flight 18 of an endless chain and at spaced points along this chain are secured a plurality of pusher arms 20. Carried by the chain and trailing each pusher arm is a deflector arm 22, each carrying a head or paddle 24 at its free end. On the other side of the trackway in the region of each scale platform is an egg accumulating mechanism which may take the form of an endless belt 26 and which is adapted to receive eggs deflected from the platform by the deflector arms and heads. This arrangement is generally in accord with Patent No. 2,961,087 and copending application Serial No. 61,585, filed October 10, 1960, Patent No. 3,135,386, it being appreciated that solenoid-actuated cam mechanisms (not shown) are actuated in response to egg weight exceeding the threshold for which an associated scale mechanism is set. Thus, in FIG. 1, if the egg $E_1$ exceeds the threshold corresponding to the grade of the accumulating station 26, such egg will, when transferred to the scale platform 16, actuate the aforesaid cam mechanism corresponding to the accumulation station 26 so that as the egg is moved off the platform 16 by the pusher arm 20 which trails the egg, the deflector arm and head associated with the preceding pusher arm 20 will swing laterally and deflect the egg onto the accumulator conveyor 26. This mechanism and its operation is fully described in copending application Serial No. 61,585, to which reference is had for details of construction.

In FIG. 2, it is illustrated that the track section immediately upstream of each scale platform 16 may, if desired, be sloped gently downwardly, as at 28. FIG. 2 further shows the egg-arrester mechanism omitted from FIG. 1 for the sake of clarity. The egg-arrester 30 is in the form of a brush having flexible bristles 32 of sufficient resiliency as to cause the trailing pusher arm 20 to exert slightly greater-than-normal pressure against the egg in order to move it past the egg-arrester. Due to this arrangement, each egg is "squirted" onto the scale platform 16 so that it possesses sufficient inertia to keep it rolling ahead of the trailing (and now spaced) pusher arm 20. The purpose of this arrangement will be apparent hereinafter. FIG. 2 also illustrates the fact that subsequent to each weighing cycle, there is a brief period during which no egg rests on the scale platform 16. The purpose of this arrangement will also appear hereinafter.

Referring now to FIGS. 3 and 4, the weighing mechanism will be seen to comprise a frame which forms the base by which the mechanism is secured to the grading machine proper so as to position the platform 16 as shown in FIG. 1. This frame conveniently takes the form of a pair of mounting plates 40 and 42 rigidly interconnected and spaced apart by a plurality of posts 44 and associated cap screw 46. Two of these posts also serve as anchor means for a pair of vertically spaced cantilever spring plates 48 and 50 which, as shown, project horizontally from the aforesaid frame and are rigidly interconnected at their outer, free ends by a pair of post members 52 and associated screws 54. For rigidity, top and bottom tie plates 56 and 58 may be used. Spacer plates 60 and 62 are also positioned in association with the screws 54, but are disposed on the inner sides of the spring plates 48 and 50. Sandwiched between the spacer plates 60 and 62 and the ends of the posts 50 are the upper and lower beams or plates 64 and 66, which, as shown, project inwardly toward the frame and carry, between their inner ends, a transducer rod or core member 68. Specifically, spacers 70 and 72 may be interposed between the ends of the core and the beams or arms 64 and 66, the fasteners 74 serving to hold the parts assembled.

The upper beam 64 projects beyond the posts 50 and is notched as at 76 to receive the shank of a threaded fastener 78 by means of which the scale platform assembly is conveniently attached to the free ends of the spring plates for ready removal and replacement. The platform 16 preferably consists of a pair of bracket plates 80 and 82 which project outwardly and upwardly, as shown, to terminate in the tip portions 84 to which the rail plates 86 and 88 are rigidly secured. The lower ends of the bracket plates 80 and 82 are rigidly united by an L-shaped mount 90, the same preferably having a nut 92 "tacked" thereto for cooperation with the threaded member 78.

A mounting block 94 receives the same posts 44 serving to mount the spring plates and these posts are threaded as at 96 to receive the nuts 98 by means of which the block 94 is rigidly connected to the frame but permitted of precise vertical positioning relative thereto. The purpose of this construction will be presently apparent.

The block 94 is split at its outer end to provide an end cap 100 removably secured thereto as by bolts 102. The block and its cap are semicircularly notched to clamp the body portion 104 of a transducer 105 therebetween. As will hereinafter appear, the transducer body contains the windings of a differential transformer with which the core member 68, noted above, cooperates. For this purpose, it will be evident that the transducer 105 is comprised of a body 104 provided with a vertically disposed bore freely passing the core 68.

As has been mentioned hereinbefore, it is vital, in order to achieve any degree of volume, to minimize the time required to damp oscillations which may result from impact loads imparted to the scale platform 16. In the present invention, this is accomplished by the use of the relatively stiff spring plates 48 and 50. To illustrate the degree of stiffness of these spring plates, it is pointed out that the total movement of the platform 16 in response to an egg being transferred thereto may be in the order of 0.0001". With this arrangement, the time required for any oscillation due to "rough" transfer of the eggs to the scale platform to be substantially completely damped is in the order of ¼ second. Thus, the aforementioned rate of thirty cases of eggs per hour is easily attained.

The mechanical arrangement shown in FIGS. 3 and 4 will be seen to accomplish certain results beneficial to egg grading machines in particular. Aside from the inherent spring stiffness mentioned above, it is important that any moving parts be so positioned as to preclude the entrance of meat from broken eggs or other foreign material. The only parts of this nature which are used in the present construction are the transducer body 104 and its core 68. However, as shown, these parts are well removed from the scale platform 16 and are, furthermore, protected by the upper and lower spring plates 48 and 50. At the same time, the amplitude of the movement imparted to the scale platform is transmitted fully to the core 68 because the rigid members 64 and 66 are connected to the spring plates 48 and 50 and are rigid with the scale platform 16. Thus, the full vertical motion of the scale platform is transmitted to the core 68 and even though this motion is of small magnitude, an adequate electrical signal may be derived therefrom by using a differential transformer for the transducer.

Therefore, and now referring to FIG. 5, the transducer body 104 mounts the main winding 120 and the differential windings 122 and 124, the arrangement being such that axial movement of the core will alter the couplings between the main and differential winding and thereby shift the phase of the output from the latter. The main winding 120 is connected to a suitable power oscillator 126 which, in the specific configuration shown, has an output at 400 cycles per second. The capacitors 128 and 130 are matched to the respective windings 122 and 124 to reduce generation of harmonics and the resistors 132, 134, 136, 138 and 140 form a bridge circuit which produces zero voltage at the output tap 142 when the core 68 is in balanced or null position. The thermistor 144 is connected in parallel with the resistor 140 to compensate for temperature effects on the scale mechanism which may cause slight shifting of the core 68 from null position. Axial motion of the core 68, through the balance point, will produce an output voltage at the adjustable tap 142 which, with reference to ground potential of the system, is proportional in magnitude to the deflection of the core and has a phase which shifts 180° from one condition of unbalance to the other.

The output of the differential transformer is coupled through the capacitor 146 to the grid of vacuum tube 148, a 6AU6 in the specific embodiment shown, which operates as a conventional pentode amplification stage. The capacitor 150 provides reduction and filtering of noise and the resistors 152, 154, 156, 158 and 160 and the capacitor 162 form, with the tube 148, the aforesaid conventional amplification stage.

The output of the tube 148 is coupled through the capacitor 164 to the grid of the half 166 of a dual triode tube. Grid leak is provided by the resistor 168 while recovery from signal overload is provided by the resistor 170. The cathode resistor 171 is provided for proper operating bias and to afford current feedback to linearize the stage, and the anode is connected to a suitable voltage source through the primary winding 172 of a transformer across the secondary winding 174 of which the output for this stage appears. The resonating capacitor 176 is connected in parallel with the primary winding 172 to purify the output signal.

The diodes 178 and 180 are connected as shown to the reference signal provided by the power oscillator 126 and, together with the resistors 182, 184, 186 and 188, and the capacitors 190 and 192, form a discriminator when the output at the transformer secondary 174 is connected to the junctions of the capacitors 190 and 192 and the resistors 182 and 184. The operation is such as to produce output signal at the junction of resistors 186 and 188 having a D.C. level which varies with the phase and amplitude of the output from the triode stage 166.

The several chokes 194, 196, 198 and 200, together with the capacitors 202, 204, 206 and 208 provide a filtering and integrating system which charges the capacitor 208 to the D.C. level of that signal at the output of transformer secondary 174 which reflects the actual weight of the egg without incurring any instantaneous voltage at the capacitor which exceeds such D.C. level.

The integrating circuit is connected to the grid of the other half 210 of the dual triode, preferably a 12AT7, and the anode of this tube is connected to the voltage divider chain comprising the resistors 212, 214, and 216, as shown. The voltage divider chain is, itself, connected between the aforementioned source of positive potential and a source of negative potential. Thus, when no signal is present at the grid of the triode portion 210, the junction 218 is at some negative potential which is insufficient to ignite the thyratron 220, the grid of which is connected, through the resistor 222, to this junction.

It will be noted that the cathode of the thyratron is normally connected to a 12 volt positive potential source through the resistor 224 so that the cathode is normally at this potential and the thyratron may not fire regardless of the condition of the grid since the grid cannot, due to the diode 226, swing positive, However, the cathode is also selectively connected to ground potential through the normally open switch 228 under the control of the cam 230 or equivalent mechanism. Thus, the thyratron may fire, assuming the grid is at the requisite potential indicating the presence of an egg on the scale platform exceeding the weight threshold corresponding to the grade under consideration, only when the switch 228 is closed. For this reason, the cam 230 is controlled in timed relation to the grader so that the switch 228 closes while the egg is on the scale platform. The switch may be closed only briefly and then reopened. Then, if the tube 220 has fired, it will be extinguished due to the drop in potential between anode and cathode. Once the tube 220 has fired, the circuit through the solenoid 232 is completed, which solenoid actuates the mechanism (not shown) for effecting lateral deflection of the egg from the track section 14.

With the specific system as shown, the spring plates 48 and 50 are of such stiffness as to cause resonance, with an egg on the platform, of about 36 cycles per second. The filtering and integrating circuit gives good dampening in about 10 cycles. Therefore, an accurate reading is obtained in about ¼ second so that at a rate of thirty cases of eggs per hour (an egg every ⅓ second) ample time is provided to permit the capacitor 208 to discharge back through the discriminator circuit during the time at which no egg is on the scale platform.

From the above it will be apparent that an egg grading mechanism has been provided which provides accuracy even at high speed by reason of its ability to rapidly accommodate for impact due to "rough" transfer of eggs to the scale platform. As stated hereinbefore, the scale mechanism is characterized by a high natural frequency which, in conjunction with the circuitry shown, permits the capacitor 208 to rapidly charge to the D.C. level voltage which accurately reflects the egg weight without incurring any instantaneous voltage greater than this D.C. level, even though "rough" transfer might otherwise tend to produce such excessive voltage. Further, the mechanism inherently provides for dependability and ease of cleaning in that no pivots, knife edges, small bearings or the like are present which might tend to become dirty or worn. In the instant construction, the only component susceptible to problems due to dirt, dust or meat from broken eggs, i.e. the transducer, is so positioned and arranged to provide a maximum of protection in this respect. Also, the construction practically obviates inaccuracies of weighing due to accumulation of egg meat; note particularly that the scale platform is of "open" construction readily allowing meat from broken eggs to pass therethrough. Likewise, it will be appreciated that the only exposed portion of the weighing mechanism is the scale platform itself, the remainder of the mechanism being laterally displaced therefrom.

In order to illustrate one operative embodiment of the electrical circuitry, the following tabulation is given, as applied to FIG. 5:

| Element | Value |
|---|---|
| 68, 120, 122 | (1). |
| 128, 130 | (2). |
| 132 | 200K. |
| 134 | 500Ω. |
| 136 | 500Ω. |
| 138 | 200K. |
| 140 | 500Ω. |
| 144 | (3). |
| 146 | .028μ. |
| 148 | 6AU6. |
| 150 | .0047μ. |
| 152 | 470K. |
| 154 | 100K. |
| 156 | 47K. |
| 158 | 1K. |
| 160 | 270K. |
| 162 | 8μ. |
| 164 | .0047μ. |
| 166 | ½ 12AT7. |
| 168 | 1 meg. |
| 170 | 1 meg. |
| 171 | 4.7K. |
| 172, 174 | TTR243. |
| 176 | .01μ. |
| 178, 180 | 1N38. |
| 182, 184 | 15K. |
| 186, 188 | 75K. |
| 190, 192 | 2μ. |
| 194, 198 | (4). |
| 196, 200 | (5). |
| 202, 204 | .1μ. |
| 206, 208 | 1μ. |
| 210 | ½ 12AT7. |
| 212 | 100K. |
| 214 | 10 meg. |
| 216 | 1 meg. |
| 220 | 2D21. |
| 222 | 100K. |
| 224 | 750Ω. |
| 226 | 1N38. |

[1] Schaevitz E100D differential transformer.
[2] Matched to individual transducer to produce minimum output at null.
[3] Thermistor Glennite 31TD5.
[4] Thordarson MI-T145.
[5] Thordarson 20C50.

It is to be understood that certain changes and modifications as illustrated and described may be made without departing from the spirit of the invention or the scope of the following claims.

We claim:
1. A scale mechanism for grading machines comprising, in combination,
   a frame assembly,
   spaced upper and lower spring plates secure at one end thereof to said frame assembly and projecting horizontally therefrom,
   post means interconnecting the outer ends and maintaining the spacing of said spring plates,
   a pair of spaced rigid arms carried by said post means and projecting therefrom horizontally inwardly between said spring plates and toward said frame assembly,
   a transducer body having a vertical bore therethrough, said body being carried by said frame assembly and positioned between the inner ends of said arms,
   a transducer core positioned in said bore and projecting from each end thereof, said core being carried in said position between the spaced inner ends of said arms,
   and an article-receiving platform rigid with the outer ends of said spring plates and positioned outwardly therefrom.

2. The scale mechanism of claim 1, further including means associated with said transducer body and said frame assembly for adjusting the vertical position of the former relative to the latter, whereby the static transducing position of the said body and core may be varied.

3. A scale mechanism for grading machines comprising, in combination, a frame assembly, spaced upper and lower spring plates secured at one end thereof to said frame assembly and projecting horizontally therefrom, post means interconnecting the outer ends and maintaining the spacing of said spring plates, a pair of spaced rigid arms carried by said post means and projecting therefrom horizontally inwardly between said spring plates and toward said frame assembly, a transducer body having a vertical bore therethrough, said body being carried by said frame assembly and positioned between the inner ends of said arms, a transducer core positioned in said bore and projecting from each end thereof, said core being carried in said position between the spaced inner ends of said arms, an article-receiving platform rigid with the outer ends of said spring plates and positioned outwardly therefrom, said platform being particularly adapted for receiving eggs and including a pair of spaced rail members for cradling an egg thereupon, and means interconnecting said rail members in a generally open latticework through which meat and shell from broken eggs may fall to render the platform self-cleaning.

4. The scale mechanism of claim 3, further including means associated with said transducer body and said frame assembly for adjusting the vertical position of the former relative to the latter, whereby the static transducing position of the said body and core may be varied.

5. A scale mechanism for grading machines, comprising in combination: a frame assembly; spaced upper and lower spring plates secured at one end thereof to said frame assembly and projecting horizontally in the same direction therefrom; post means interconnecting the outer ends and maintaining the spacing of said spring plates; rigidly extending arm means rigidly connected to said post means and projecting therefrom generally horizontally inwardly toward said frame assembly; a transducer body having a vertical bore therethrough, said body being carried by said frame assembly with its said bore in vertical alignment with the inner end extremities of said rigid arm means; a transducer core positioned in said bore and projecting from at least one end thereof, said core being connected to said inner end extremities of said rigid arm means; and article-receiving platform rigid with the outer ends of said spring plates and positioned outwardly therefrom.

6. The scale mechanism defined in claim 5, wherein said platform is particularly adapted for receiving eggs and comprises a pair of spaced rail members for cradling an egg thereupon, and means interconnecting said rail members in a generally open lattice work through which meat and shell from broken eggs may fall to render the platform self-cleaning.

References Cited by the Examiner

UNITED STATES PATENTS

| | | | |
|---|---|---|---|
| 1,954,164 | 4/1934 | Wyland | 209—121 |
| 2,885,611 | 5/1959 | MacGeorge | 177—210 X |
| 2,954,969 | 10/1960 | McCullough et al. | 177—145 |
| 2,961,087 | 11/1960 | Reading | 198—33 |
| 2,969,228 | 1/1961 | Appius | 177—229 |
| 2,990,937 | 7/1961 | Goslin | 198—39 |
| 3,026,954 | 3/1962 | Appius | 177—248 |
| 3,062,308 | 11/1962 | Anderson et al. | 177—229 |
| 3,081,835 | 3/1963 | Chatillon | 177—229 |
| 3,107,743 | 10/1963 | Knobel | 177—116 |
| 3,108,647 | 10/1963 | Harmon et al. | 177—1 |
| 3,133,606 | 5/1964 | Thomson | 177—210 |
| 3,135,386 | 6/1964 | Reading | 209—121 |

LOUIS J. CAPOZI, *Primary Examiner.*

LEO SMILOW, *Examiner.*

STEPHEN J. TOMSKY, *Assistant Examiner.*